United States Patent
Jeong et al.

(10) Patent No.: US 11,425,359 B2
(45) Date of Patent: Aug. 23, 2022

(54) APPARATUS AND METHOD FOR GENERATING THREE-DIMENSIONAL IMAGE

(71) Applicant: LG ELECTRONICS INC., Seoul (KR)

(72) Inventors: Chansung Jeong, Seoul (KR); Hyojin Nam, Seoul (KR); Sangkeun Lee, Seoul (KR); Yongho Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/270,819

(22) PCT Filed: Mar. 14, 2019

(86) PCT No.: PCT/KR2019/002964
§ 371 (c)(1),
(2) Date: Feb. 23, 2021

(87) PCT Pub. No.: WO2020/040390
PCT Pub. Date: Feb. 27, 2020

(65) Prior Publication Data
US 2021/0321080 A1    Oct. 14, 2021

(30) Foreign Application Priority Data

Aug. 23, 2018  (KR) .................. 10-2018-0098356
Aug. 28, 2018  (KR) .................. 10-2018-0100990

(51) Int. Cl.
*H04N 13/254*    (2018.01)
*H04N 13/207*    (2018.01)
(Continued)

(52) U.S. Cl.
CPC .......... *H04N 13/254* (2018.05); *G02B 27/30* (2013.01); *G02B 27/4205* (2013.01);
(Continued)

(58) Field of Classification Search
USPC ............................................. 348/46
See application file for complete search history.

(56) References Cited

U.S. PATENT DOCUMENTS

| 10,194,129 B2* | 1/2019 | Chang ................. H04N 13/254 |
| 2012/0262553 A1* | 10/2012 | Chen .................... H04N 13/111 |
| | | 348/47 |

(Continued)

FOREIGN PATENT DOCUMENTS

| KR | 1020170029315 | 3/2017 |
| KR | 1020180006377 | 1/2018 |

OTHER PUBLICATIONS

PCT International Application No. PCT/KR2019/002964, International Search Report dated Jul. 12, 2019, 10 pages.

*Primary Examiner* — Behrooz M Senfi
(74) *Attorney, Agent, or Firm* — Lee, Hong, Degerman, Kang & Waimey PC

(57) ABSTRACT

The present invention provides a depth image generation apparatus comprising: a light source for generating light to be emitted toward an object in order to solve an SNR problem caused by resolution degradation and an insufficient amount of received light, while not increasing the amount of emitted light when photographing a remote object; a first optical system for emitting, as a dot pattern and at the object, the light generated by the light source; an image sensor receiving the light reflected by the object, so as to convert the received light into an electrical signal; an image processor for acquiring depth data through the electrical signal; and a control unit connected to the light source, the first optical system, the image sensor and the image processor, wherein the control unit controls the first optical system so as to scan the object by moving the dot pattern in a preset pattern.

10 Claims, 12 Drawing Sheets

(51) Int. Cl.
*H04N 13/296* (2018.01)
*G02B 27/30* (2006.01)
*G02B 27/42* (2006.01)
*H04N 13/00* (2018.01)

(52) U.S. Cl.
CPC ......... *H04N 13/207* (2018.05); *H04N 13/296* (2018.05); *H04N 2013/0081* (2013.01)

(56) References Cited

U.S. PATENT DOCUMENTS

| | | | |
|---|---|---|---|
| 2013/0222543 A1* | 8/2013 | Bae | G01S 17/08 |
| | | | 348/46 |
| 2016/0210753 A1 | 7/2016 | Klusza et al. | |
| 2018/0063390 A1 | 3/2018 | Trail | |
| 2019/0310368 A1* | 10/2019 | LaChapelle | G02B 27/0977 |
| 2021/0035267 A1* | 2/2021 | Keh | H04N 5/33 |
| 2021/0268586 A1* | 9/2021 | Takeshita | B22F 12/41 |

* cited by examiner (a)

(b)

(a)  (b)

APPARATUS AND METHOD FOR GENERATING THREE-DIMENSIONAL IMAGE

CROSS-REFERENCE TO RELATED APPLICATIONS

This application is the National Stage filing under 35 U.S.C. 371 of International Application No. PCT/KR2019/002964, filed on Mar. 14, 2019, which claims the benefit of earlier filing date and right of priority to Korean Application Nos. 10-2018-0098356, filed on Aug. 23, 2018 and 10-2018-0100990, filed on Aug. 28, 2018, the contents of which are all hereby incorporated by reference herein their entirety.

TECHNICAL FIELD

The present disclosure relates to an apparatus and method for generating a three-dimensional image and, more particularly, to an apparatus and method for measuring depth information of an object and generating a three-dimensional image based on the measured depth information of the object.

BACKGROUND ART

A three-dimensional stereoscopic image is generated based on color and depth images of an object to give a sense of three dimensions and a sense of immersion. In this case, the depth of the object needs to be measured to generate the depth image of the object.

The time of flight (TOF) method may be used to measure the depth of the object. According to the TOF method, the depth of the object is obtained by measuring the time required for light to be reflected by and return from an object after being emitted to the object.

FIG. 1 illustrates the structure of a general TOF camera 100. The TOF camera 100 may include a light transmitter 110 configured to emit light to an object and a light receiver 120. That is, the TOF camera 100 may obtain depth information, which is the distance between the camera and object, based on the phase difference between the light emitted from the light transmitter 110 and light reflected by the object. Specifically, one pixel of an image sensor of the TOF camera 100 may include an in-phase receptor for receiving in-phase light from the light reflected by the object and an out-phase receptor for receiving out-phase light from the light. That is, the TOF camera 100 may measure the phase difference between the emitted light and the light reflected by the object based on the light received by the in-phase and out-phase receptors and obtain the depth information of the object.

FIG. 2 illustrates the optical structure of a conventional TOF camera 100, and FIG. 3 is a block diagram illustrating the conventional TOF camera 100.

A light transmitter 110 of the conventional TOF camera 100 may include a light source 111 configured to generate light and a diffuser configured to emit the light generated by the light source 111 in the form of a surface light source at a specific angle.

The light emitted from the light transmitter 110 is reflected by an object 300 and then received by a light receiver 120. The light receiver 120 may include a reception (Rx) lens 121 configured to guide the light reflected by the object 300 to an image sensor 122, the image sensor 122 configured to convert the received light into an electrical signal, and an image processor 123 configured to generate a depth image based on the electrical signal from the image sensor 122. In some cases, the light receiver 120 may further include a filter configured to pass a specific wavelength.

The TOF camera 100 based on the TOF method may be applied to various fields such as automotive (camera for vehicles), virtual reality (VR), robots, people counting, surveillance, etc. However, considering that light is emitted from the light transmitter 100 of the TOF camera 100 to measure depth information, the strength of the light is limited to protect the eyes of a subject (person). When the strength of the light emitted to the object 300 is reduced, the signal-to-noise ratio (SNR) may increase due to an insufficient amount of light received by the light receiver 120. When a distant subject is photographed or when the effects of external light increase, the reliability of the obtained depth image may be degraded.

Further, when the distant subject is photographed, the size of a divided area corresponding to each receiving element of the image sensor 122 increases so that the resolution of the depth image relatively decreases.

DISCLOSURE

Technical Problem

The object of the present disclosure is to improve the reliability of a depth image obtained by long-range photography when the amount of light generated by a light source is limited for eye protection.

Technical Solution

In one aspect of the present disclosure, an apparatus for generating a depth image is provided. The apparatus may include a light source configured to generate light to be emitted to an object, a first optical system configured to emit the light generated by the light source to the object in a dot pattern, an image sensor configured to receive light reflected by the object and convert the received light into an electrical signal, an image processor configured to obtain depth data from the electrical signal, and a controller operably connected to the light source, the first optical system, the image sensor, and the image processor. The controller may be configured to control the first optical system to scan the object by moving the dot pattern according to a predetermined pattern.

The first optical system may include a collimator lens configured to collect the light emitted from the light source as parallel light, a diffraction optical element configured to emit the parallel light to the object in the dot pattern, and an actuator configured to control the movement of the dot pattern.

The actuator may be a voice coil motor, a liquid lens, or a microelectromechanical systems (MEMS) scanner.

The controller may be configured to control the image processor to obtain information about the location of the dot pattern and obtain the depth data based on the obtained location information.

The information about the location of the dot pattern may include information about the location of a point to which one dot is emitted in a divided area corresponding to each receiving element of the image sensor. The controller may be configured to control the image processor to divide the divided area into subdivided areas and obtain the depth data for each of the subdivided areas.

The controller may be configured to control the image processor to define the number of subdivided areas depending on the distance to the object and obtain the depth data based on the defined number of subdivided areas.

The controller may be configured to obtain the information about the location of the dot pattern based on information about the movement of the actuator.

The image sensor may include multiple arrays of receiving elements in the form of a single photon avalanche diode (SPAD) array, and the multiple arrays of receiving elements may be equivalent to the dot pattern.

The apparatus may further include a second optical system configured to receive the reflected light of the dot pattern by matching the light with the multiple arrays of receiving elements.

The light source may be a vertical cavity surface emitting laser (VCSEL).

The light source may include a plurality of VCSELs in relation to the multiple arrays of receiving elements.

In another aspect of the present disclosure, a method of controlling a device for generating a depth image is provided. The method may include emitting light to an object in a dot pattern, scanning the object by moving the dot pattern according to a predetermined pattern, and generating depth data based on light reflected by the object and received by an image sensor.

The generation of the depth data may include acquiring information about a location of the dot pattern and acquiring the depth data based on the information about the location of the dot pattern.

The information about the location of the dot pattern may include information about the location of a point to which one dot is emitted in a divided area corresponding to each receiving element of the image sensor. The acquisition of the depth data based on the information about the location of the dot pattern may include dividing the divided area into subdivided areas and obtaining the depth data for each of the subdivided areas.

The method may include obtaining the depth data based on the information about the location of the dot pattern, defining the number of subdivided areas depending on the distance to the object, and obtaining the depth data based on the number of subdivided areas.

Advantageous Effects

According to the present disclosure, an insufficient amount of light that occurs when light is emitted in the form of a surface light source at distance may be solved.

It is possible not only to satisfy restrictions for eye protection by maintaining the amount of light generated by a light source but also to guarantee that an image sensor receives a sufficient amount of light by collecting and emitting the light generated by the light source in a dot pattern.

Since the light generated by the light source is emitted in the dot pattern and the dot pattern is moved according to a predetermined pattern, depth data for the overall appearance of an object may be obtained.

Since information about the location of the dot pattern emitted to the object is recognized, a depth image with a higher resolution than the resolution of the image sensor may be obtained.

It will be apparent to those skilled in the art that various modifications and variations can be made in the present disclosure without departing from the spirit and scope of the disclosure. Thus, it is intended that the present disclosure cover the modifications and variations of this disclosure provided they come within the scope of the appended claims and their equivalents.

BEST MODE

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus may be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Figure 4:
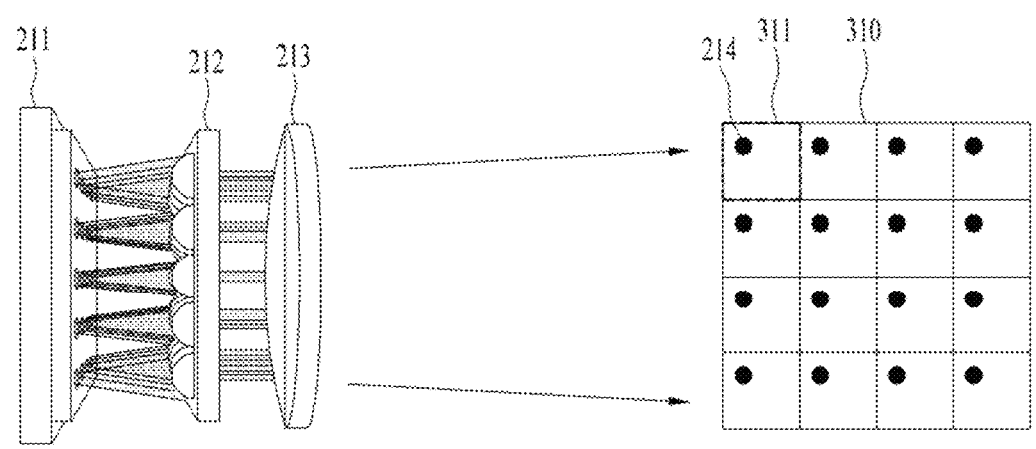
FIG. 4 illustrates the optical structure of a TOF camera according to an embodiment of the present disclosure.
Figure 5:
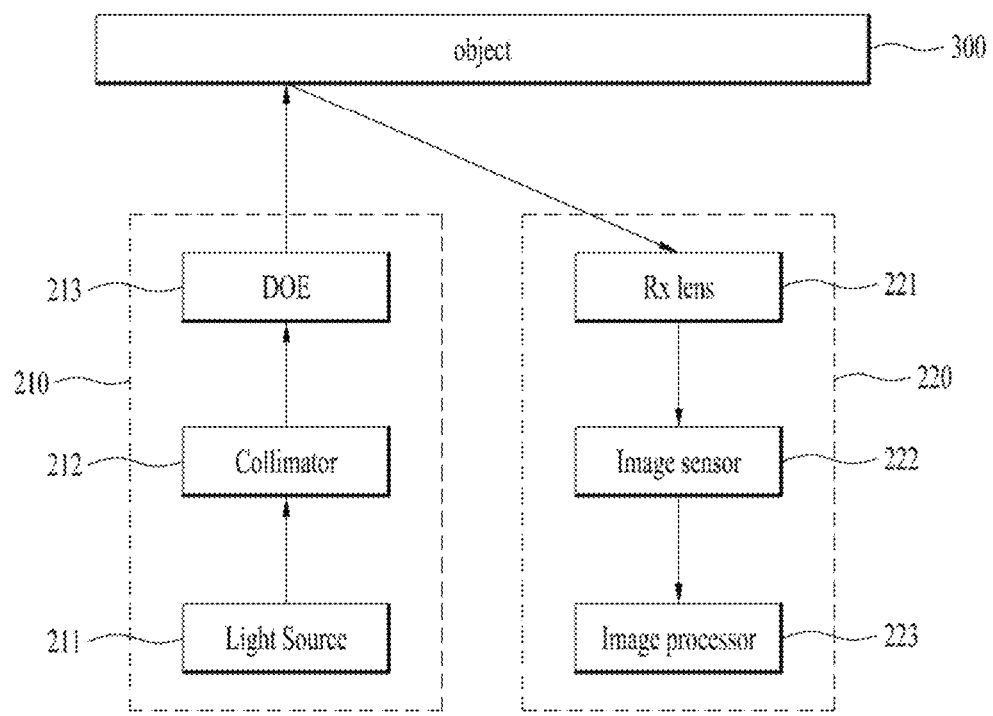
FIG. 5 is a block diagram illustrating the TOF camera according to an embodiment of the present disclosure.

FIG. 4 illustrates the optical structure of a TOF camera according to an embodiment of the present disclosure, and FIG. 5 is a block diagram illustrating the TOF camera according to an embodiment of the present disclosure.

The present disclosure relates to a TOF camera for obtaining depth data of an object 300 based on a distance difference when light emitted from a light transmitter 210 is reflected by the object 300 and received by a light receiver 220.

The light transmitter 210 may include a light source 211 configured to generate the light emitted to the object 300 and a first optical system 212 and 213 configured to emit the light generated by the light source 211 in a dot pattern.

The light source 211 may be a vertical cavity surface emitting laser (VCSEL). Unlike a general side surface emitting laser, the VCSEL may emit light in a vertical direction to the surface of an EPI wafer. The VCSEL has a number of cavities for light emission so that the VCSEL may be suitable for light emission in a dot pattern. The light emitted from the VCSEL has high straightness, and in particular, the light emitted from one cavity may have a divergence angle of 10 to 20 degrees. The VCSEL may generate and emit light with a wavelength of 905 to 960 nm to obtain a three-dimensional image.

The first optical system 212 and 213 may include a collimator lens 212 for collecting the light emitted from the light source 211 to form parallel light and a diffractive optical element (DOE) 213 for emitting the parallel light to the object 300 in a dot pattern 214. The first optical system 212 may further include an actuator for controlling the movement of the dot pattern 214. Details of the actuator will be described with reference to FIGS. 6 and 7.

The collimator lens 212 may be configured to collect the light emitted from each cavity of the VCSEL and form the parallel light.

The DOE 213 may be configured to emit the parallel light formed by the collimator lens 212 in the dot pattern 214 based on the diffraction and interference of light by a nano-pattern. The nano-pattern of the DOE 213 may be made of UV resin with a periodic nanostructure pattern on a glass substrate.

The light emitted from the light transmitter 210 is reflected by the object 300 and received by the light receiver 220. The light receiver 220 may include an receiver (Rx) lens 221 for guiding the light reflected by the object 300 to an image sensor 222, the image sensor 222 for converting the received light into an electrical signal, and an image processor 223 for generating a depth image based on the electrical signal from the image sensor 222. In some cases, the light receiver 220 may further include a filter for passing a specific wavelength.

The image sensor 222 may have a VGA resolution of 640×480 or higher. The image sensor 222 may include multiple arrays of receiving elements in the form of a single photon avalanche diode (SPAD) array, or a CMOS image sensor may be used. The receiving elements of the image sensor 222 may include an in-phase receptor for receiving in-phase light from the light reflected by the object 300 and an out-phase receptor for receiving out-phase light from the light. The image processor 223 may be configured to measure a phase difference between the emitted light and the light reflected by the object 300 based on the light received by the in-phase and out-phase receptors. In addition, the image processor 223 may be configured to obtain information about the depth of the object 300 based on the measured phase difference.

The dot pattern 214 may match one-to-one with each of the receiving elements of the image sensor 222. That is, the number of dot patterns 214 may be the same as the resolution of the image sensor 222. In other words, a plurality of light sources 211 may be provided in relation to the receiving elements of the image sensor 222. In this case, the cavities of the VCSEL may be used to implement the plurality of light sources 211. Specifically, FIG. 4 illustrates an embodiment in which the dot pattern 214 matches one-to-one with each divided area 311, which corresponds to each receiving element of the image sensor 222, and the dot pattern 214 is emitted to an emission area 310.

According to the present disclosure, a controller for controlling the light transmitter 210 and light receiver 220 may be included. The controller may control the first optical system 212 and 213 to scan the object 300 by moving the dot pattern 214 based on a predetermined pattern. Specifically, the controller may emit the parallel light, which passes through the collimator lens 212, in the dot pattern 214 by actively controlling the DOE 213 and scan the object 300 by moving the dot pattern 214 based on the predetermined pattern. The movement pattern of the dot pattern 214 will be described later with reference to FIG. 8.

Figure 1:
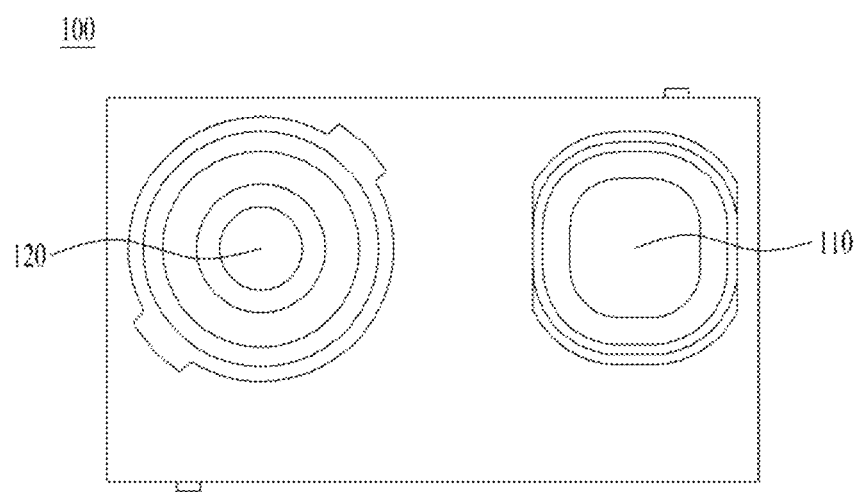
FIG. 1 illustrates the structure of a general time of flight (TOF) camera.
Figure 2:
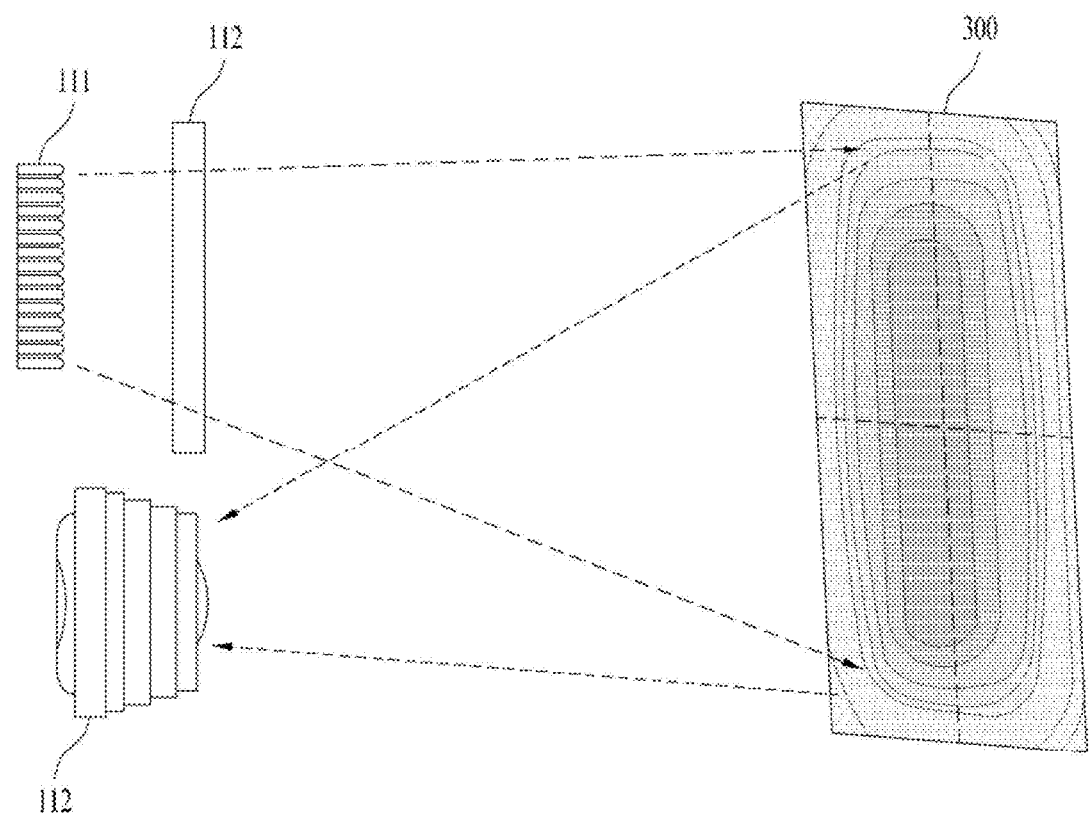
FIG. 2 illustrates the optical structure of a conventional TOF camera.
Figure 3:
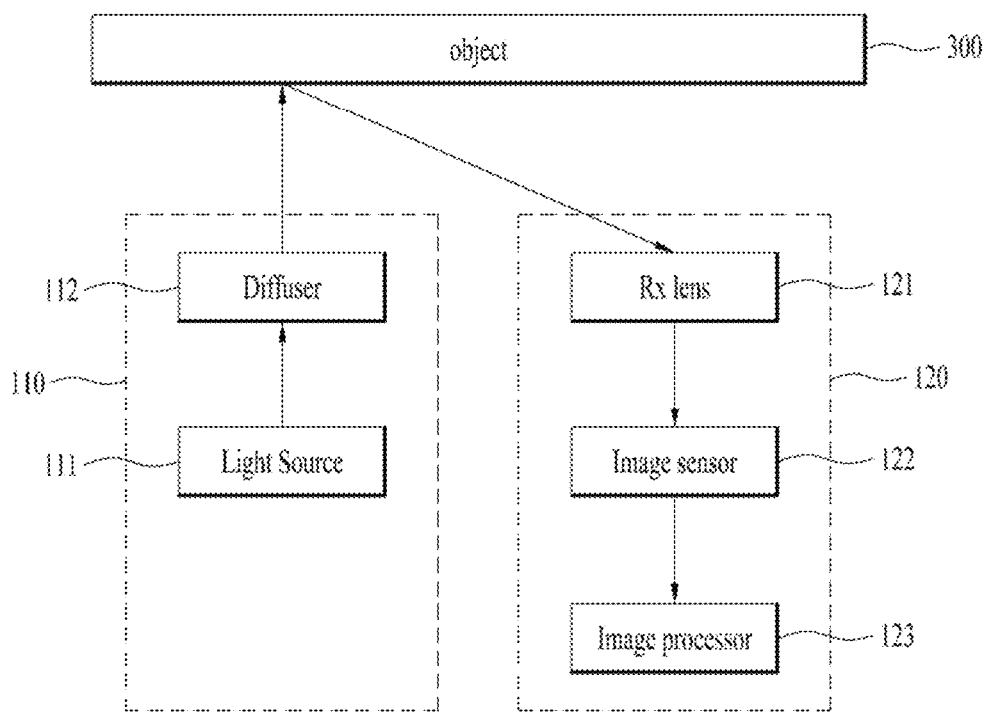
FIG. 3 is a block diagram illustrating the conventional TOF camera.

The object of the present disclosure is to solve the aforementioned problems that may occur when light is emitted in the form of a surface light source as in the conventional TOF camera 100 described above in FIG. 2 when the object 300 is placed at a long distance. The following problems may occur when the distant object 300 is captured by the conventional TOF camera 100. First, the resolution may decrease due to an increase in the size of the divided area, which is related to each receiving element of the image sensor 222. Second, the signal-to-noise ratio (SNR) may increase due to a decrease in the amount of light received by each receiving element. The second problem may be solved by increasing the power of the light sources 211. However, it is difficult to increase the power of the light source 211 for the following reasons: eyesight protection, cost, etc. Further, the first problem may not be solved by increasing the amount of light from the light source 211.

To solve the above problems, the present disclosure adopts the following technique: the light generated by the light source 211 is collected and emitted in the dot pattern 214, and the object 300 is scanned by moving the dot pattern 214 based on the predetermined pattern.

According to the present disclosure, since the light generated by the light source 211 is collected and emitted, each receiving element of the image sensor 222 may obtain a sufficient light amount without an increase in the power of the light source 211. Therefore, the image processor 223 may also provide reliable depth data.

In addition, since the object 300 is scanned by moving the dot pattern 214 according to the predetermined pattern, depth data for the overall appearance of the object 300 may be obtained. Details will be described later.

Figure 6:
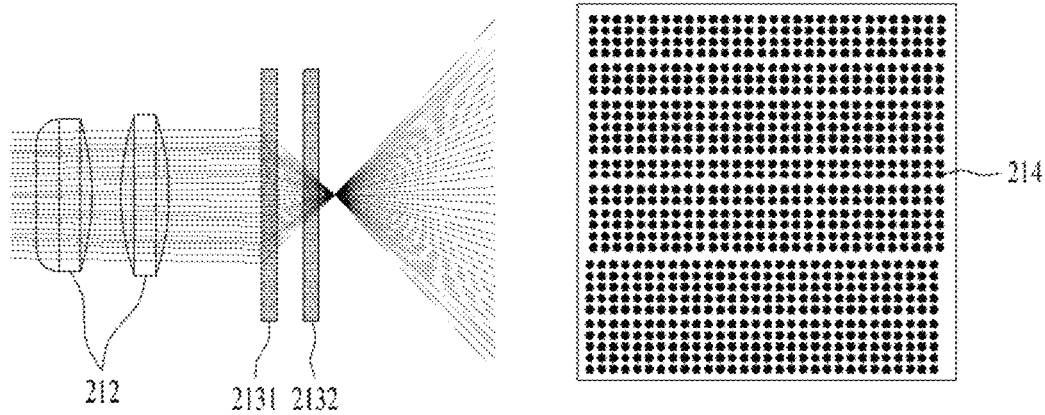
FIGS. 6 to 8 are diagrams for explaining methods of moving a dot pattern using an actuator according to an embodiment of the present disclosure.
Figure 6:
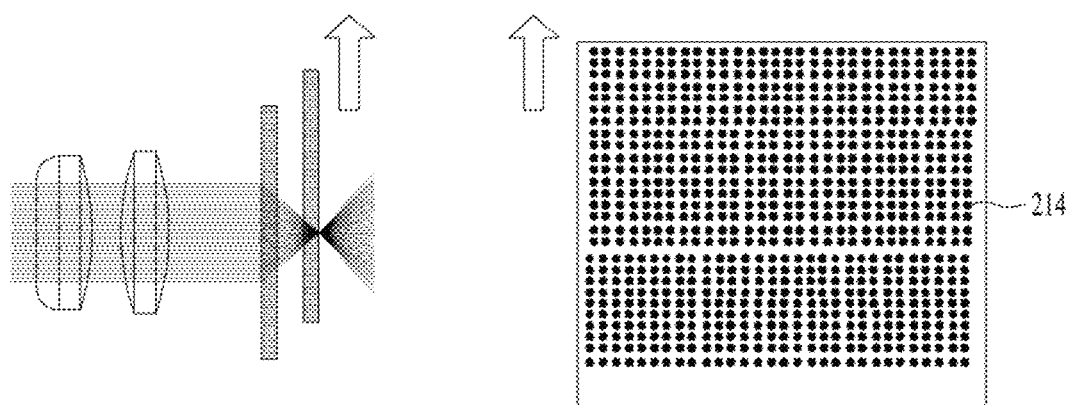
Figure 7:
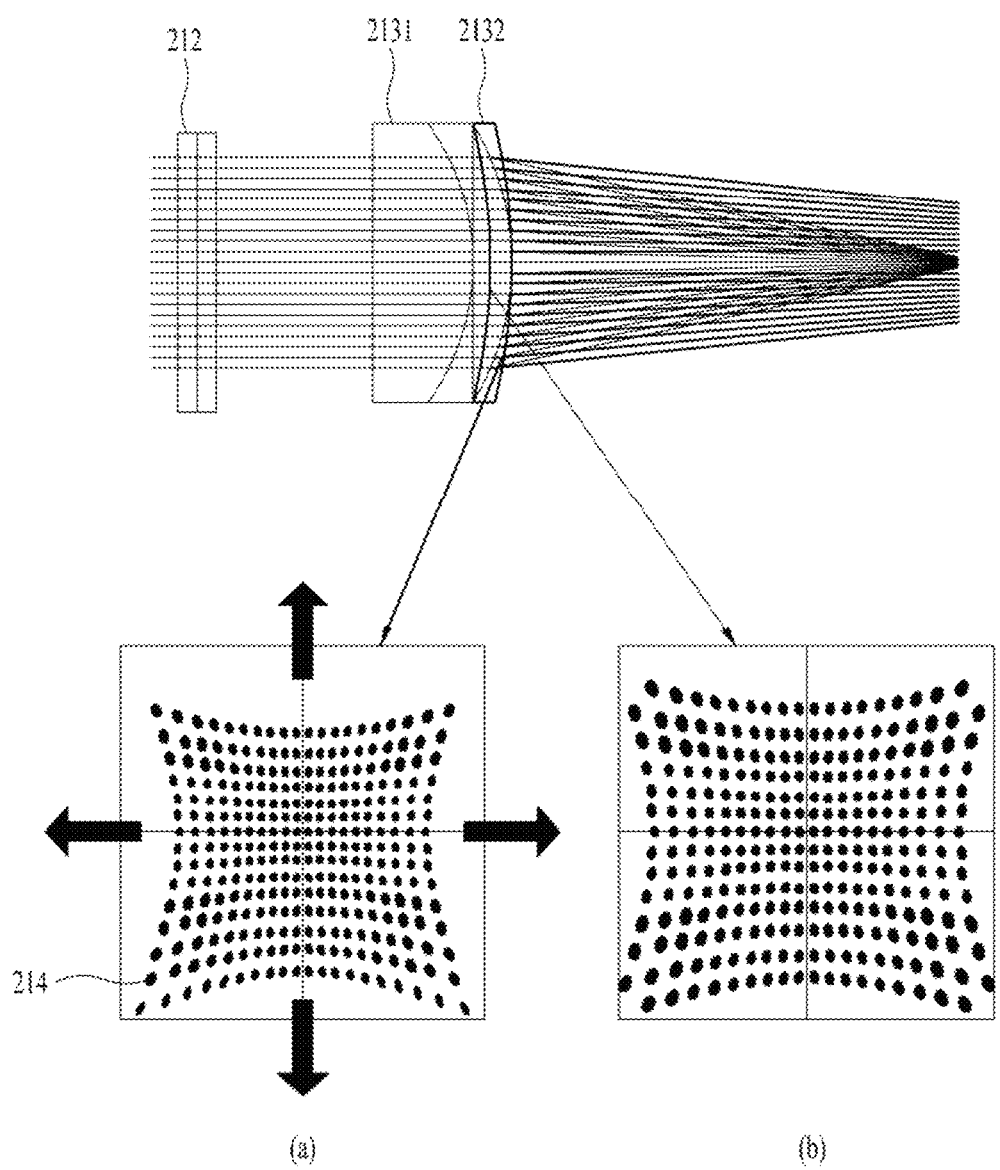
Figure 8:
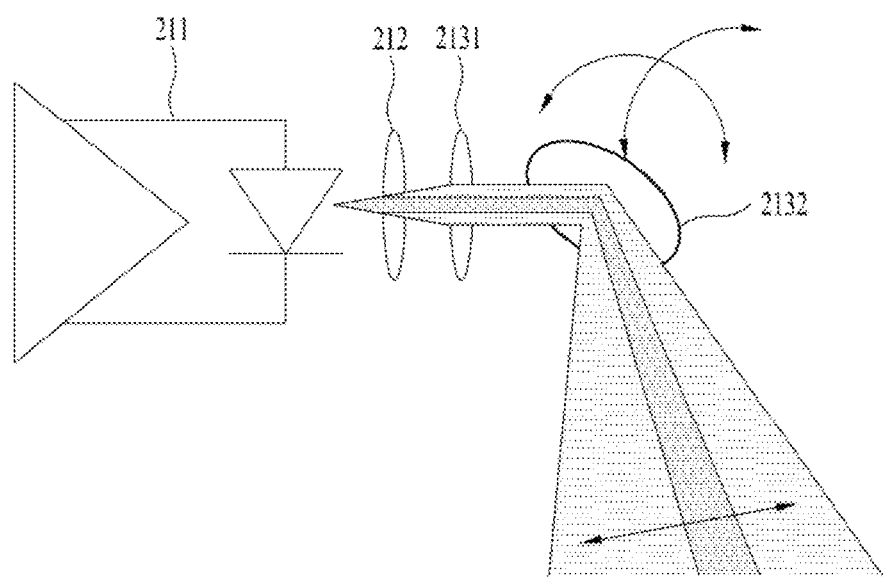

FIGS. 6 to 8 are diagrams for explaining methods of moving a dot pattern using an actuator according to an embodiment of the present disclosure.

According to the present disclosure, the light generated by the light source 211 is emitted to the object 300 in the dot pattern 214, and each dot of the dot pattern 214 moves in each divided area to scan the object 300.

In the present disclosure, the actuator may be used to move the dot pattern 214 in each divided area.

The actuator may include a voice coil actuator, an OIS, a piezoelectric actuator, an MEMS scanner, etc.

Specifically, FIG. 6 shows an embodiment in which a voice coil actuator is used to move the dot pattern 214. The voice coil actuator may control the movement of the DOE 213 through which the dot pattern 214 passes based on the directions of a magnetic field and current. The light generated by the light source 211 (see FIG. 4) may be collected as the parallel light after passing through the collimator lens 212, and the parallel light may be emitted through a fixed DOE 2131 to the object 300 in the dot pattern 214. After passing through the fixed DOE 2131, the dot pattern 214 may be moved by a movable DOE 2132, which is capable of moving on a plane by the actuator. FIG. 6 (a) shows a state in which the movable DOE 2132 does not move and the location of the dot pattern 214 in the corresponding state. FIG. 6 (b) shows a state in which the movable DOE 2132 moves in a direction on the plane by the voice coil actuator and the location of the dot pattern 214 in the corresponding state. That is, the dot pattern 214 may be moved by the movement of the movable DOE 2132 according to the predetermined pattern. According to the present disclosure, when the voice coil actuator is used to move the dot pattern 214, the dot pattern 214 may move along X and Y axes to scan the object 300.

FIG. 7 illustrates an embodiment in which a liquid lens 2132 is used to move the dot pattern 214. The liquid lens 2132 may control the movement of the dot pattern 214 by changing the curvature of the lens through which the dot pattern 214 passes. The light generated by the light source 211 (see FIG. 4) may be collected as the parallel light after passing through the collimator lens 212, and the parallel light may be emitted through the fixed DOE 2131 to the object 300 in the dot pattern 214. After passing through the fixed DOE 2131, the dot pattern 214 may be moved by the liquid lens 2132 having the variable curvature. FIGS. 7 (a) and (b) show that the dot pattern 214 depends on the curvature of the liquid lens 2132. Specifically, FIG. 7 (a) shows the dot pattern 214 when the liquid lens 2132 has a low curvature, and FIG. 7 (b) shows the dot pattern 214 when the liquid lens 2132 has a high curvature. When the curvature of the liquid lens 2132 is low, the dot pattern 214 may be centralized. On the contrary, when the curvature of the liquid lens 2132 is high, the dot pattern 214 may be dispersed. In other words, according to the present disclosure, when the liquid lens 2132 is used to move the dot pattern 214, the dot pattern 214 may transition from the centralized state to the dispersed state to scan the movement of the object 300.

FIG. 8 illustrates an embodiment in which an MEMS scanner 2132 is used to move the dot pattern 214. The MEMS scanner 2132 may control the movement of the dot pattern 214 by rotating a mirror configured to reflect the dot pattern 214 with respect to the axis. The light generated by the light source 211 (see FIG. 4) may be collected as the parallel light after passing through the collimator lens 212, and the parallel light may be emitted through the fixed DOE 2131 to the object 300 in the dot pattern 214. After passing through the fixed DOE 2131, the dot pattern 214 may be reflected by the mirror of the MEMS scanner 2132 and then emitted to the object 300. The mirror of the MEMS scanner 2132 may rotate with respect to the axis to move the dot pattern 214. The mirror of the MEMS scanner 2132 may rotate with respect to one or two axes. FIG. 8 shows that the MEMS scanner 2132 rotates with respect to two axes. The dot pattern 214 may move along the X and Y axes with respect to the mirror rotation axis of the MEMS scanner 2132 to scan the object 300.

The present disclosure adopts the following technique: the light generated by the light source 211 is collected and emitted to the object 300 in the dot pattern 214, instead of emitting the light in the form of a surface light source, and the dot pattern 214 is moved by the actuator to scan the overall appearance of the object 300. Hereinbelow, patterns for moving the dot pattern 214 will be described.

Figure 9:
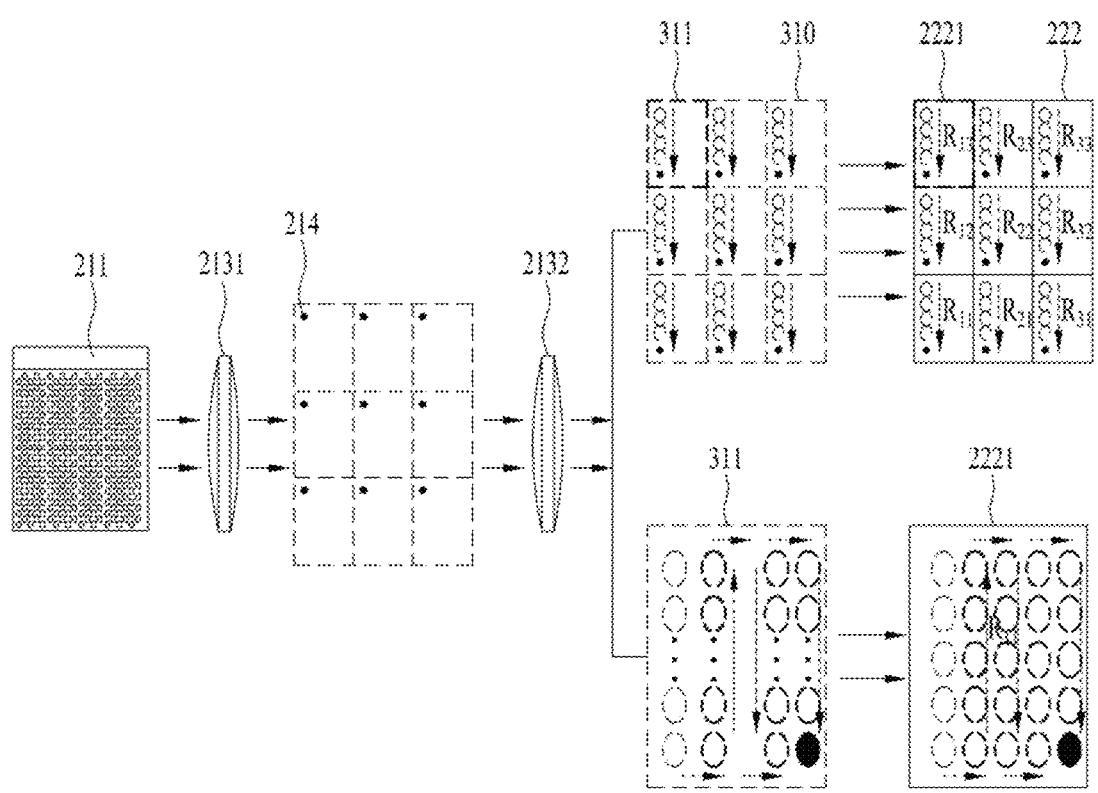
FIG. 9 is a diagram for explaining patterns for moving light emitted in a dot pattern according to an embodiment of the present disclosure.

FIG. 9 is a diagram for explaining patterns for moving the light emitted in the dot pattern 214 according to an embodiment of the present disclosure. FIG. 9 shows the movement patterns of the dot pattern 214 based on the embodiment illustrated in FIG. 7.

The light generated by the light source 211 (see FIG. 4) may be collected as the parallel light after passing through the collimator lens 212, and the parallel light may be emitted through the fixed DOE 2131 to the object 300 in the dot pattern 214. After passing through the fixed DOE 2131, the dot pattern 214 may be moved by the movable DOE 2132, which is capable of moving on a plane by the voice coil actuator. The dot pattern 214 may be emitted such that the dot pattern 214 matches one-to-one with the divided area 311 in the emission area 310 including the object 300 (see FIG. 5). The divided area 311 may correspond to each receiving element 2221 of the image sensor 222. That is, emission light forming one dot of the dot pattern 214 may be emitted to one divided area 311, reflected, and then received by one receiving element 2221 of the image sensor 222.

The dot pattern 214 is formed by collecting the light generated by the light source 211. The area occupied by one dot may be smaller than the divided area 311. That is, when the light is emitted to the object 300 in the dot pattern 214, the depth data of the object 300 may not be data about the overall appearance of the object 300 so that it may have low reliability. However, according to the present disclosure, since each dot of the dot pattern 214 moves in the divided area 311 to obtain the depth data of the object 300, the reliability of the obtained depth data may be improved.

Each dot of the dot pattern 214 may move with the same pattern, instead of moving independently. Specifically, FIG. 9 (a) shows that a group of dots move with the same pattern, and FIG. 9 (b) shows that one dot moves in one divided area 311.

Each dot of the dot pattern 214 may move within the corresponding divided area 311 such that the entire area is scanned. To this end, the dot pattern 214 moves along a circle in one direction to scan the emission area 310. Since each dot of the dot pattern 214 is smaller than the divided area 311, the dot pattern 214 may move along a circle rather than on a straight line to scan the entirety of the divided area 311.

That is, according to the present disclosure, the dot pattern 214 may divide the emission area into the divided areas 311, and light may be emitted such that each dot matches with each of the divided areas 311. Further, the dot pattern 214 may move according to the predetermined pattern so that each dot scans the divided area 311. In this case, a group of dots may move according to the predetermined pattern.

According to the present disclosure, since the dot pattern 214 is used to collect and emit light, the image sensor 222 may obtain a sufficient amount of light. Further, since the dot pattern 214 moves according to the predetermined pattern, it is possible to obtain the depth data for the overall appearance of the object 300 and also improve the resolution.

When light is emitted in the form of a surface light source as in the conventional TOF camera, it is possible to obtain a depth image corresponding to the resolution of the image sensor 222.

However, according to the present disclosure, since the emission area 310 is scanned by moving the dot pattern 214, it is possible to obtain a depth image with a higher resolution than that of the image sensor 222. In other words, the present disclosure may be suitable for obtaining the depth image of a distant object. Hereinafter, a method of obtaining a depth image with a higher resolution than that of the image sensor 222 will be described.

Figure 10:
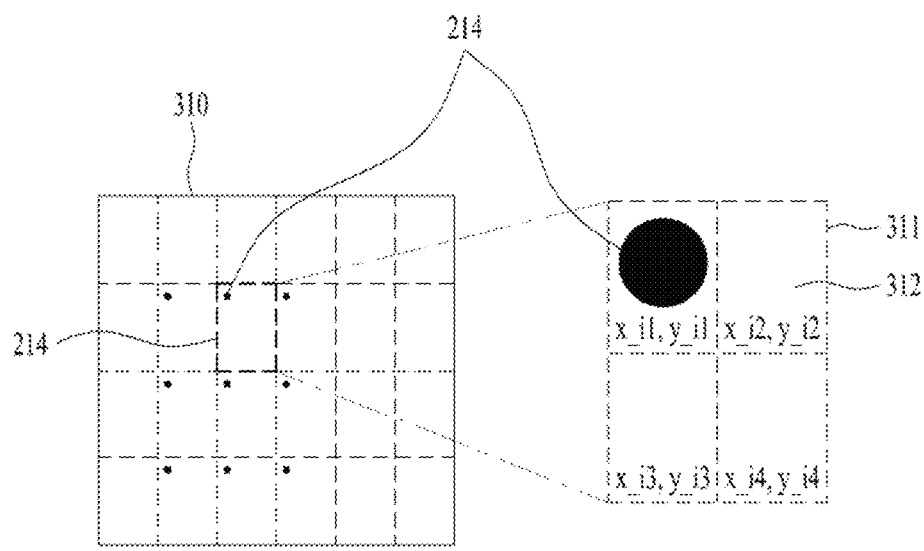
FIG. 10 is a diagram for explaining a method of obtaining a higher resolution than the resolution of an image sensor by dividing a divided area corresponding to one dot into subdivided areas.

FIG. 10 is a diagram for explaining a method of obtaining a higher resolution than the resolution of an image sensor by dividing a divided area corresponding to one dot into subdivided areas.

The image sensor 222 includes a plurality of receiving elements correspond to its resolution. Since the number of receiving elements is fixed, the resolution of the image sensor 222 is not variable. However, according to the present disclosure, it is possible to obtain a depth image with a higher resolution than that of the image sensor 222 based on information about a location to which the dot pattern 214 is emitted.

To this end, the controller of the present disclosure may be configured to control the image processor 223 to obtain information about the location of the dot pattern 214 and obtain depth data based on the obtained location information. The controller of the present disclosure may obtain the location information about the dot pattern 214 based on information about driving of the actuator described above with reference to FIGS. 6 to 8.

The location information about the dot pattern 214 may include information about the coordinates of the dot 214 emitted to the divided area 311 corresponding to each receiving element of the image sensor 222. The divided area 311 may be divided into subdivided areas 312, and the controller may recognize which subdivided area 312 the dot 214 is emitted based on the movement of the dot 214. The location information about the dot pattern 214 may be equivalent to information about the coordinates of the subdivided areas 312 to which the dot pattern 214 is emitted.

Each receiving element of the image sensor 222 may be configured to convert received light, which is reflected by each subdivided area 312, into an electrical signal, and the image processor 223 may be configured to obtain depth data for each subdivided area 312. That is, according to the present disclosure, one divided area 311 may be divided into subdivided areas 312, and independent depth data may be acquired from each subdivided area 312, thereby obtaining depth data with a higher resolution than that of the image sensor 222.

As the number of subdivided areas 312 resulting from dividing one divided area 311 increases, the resolution of depth data may increase. However, the time and load required to obtain the depth data may increase. When the object 300 is close, depth data obtained without an increase in the resolution may also have sufficient reliability. Thus, the controller of the present disclosure may be configured to control the number of subdivided areas 312 depending on the distance to the object 300 and control the movement of the dot pattern 214 based thereon.

The controller of the present disclosure may first photograph a depth image to define the number of subdivided areas 312 and obtain approximate depth information of the object 300 based on the depth image. In this case, since the object of the first photography is to obtain the approximate depth information of the object 300, depth data may be obtained with no movement of the dot pattern 214 by the actuator. After defining the number of subdivided areas 312 based on the first photography, the controller may configure the movement of the dot pattern 214 based on the number of subdivided areas 312. Further, the controller may perform second photography to obtain depth data for each subdivided area 312.

Figure 11:
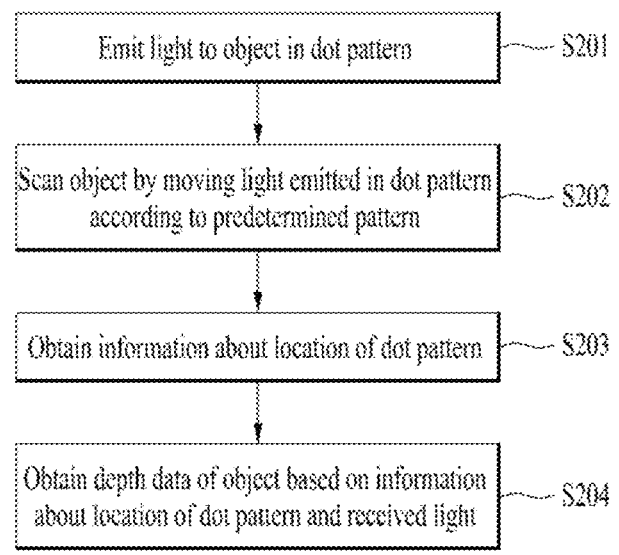
FIGS. 11 and 12 are flowcharts illustrating methods of obtaining a depth image by emitting light in a dot pattern according to an embodiment of the present disclosure.
Figure 12:
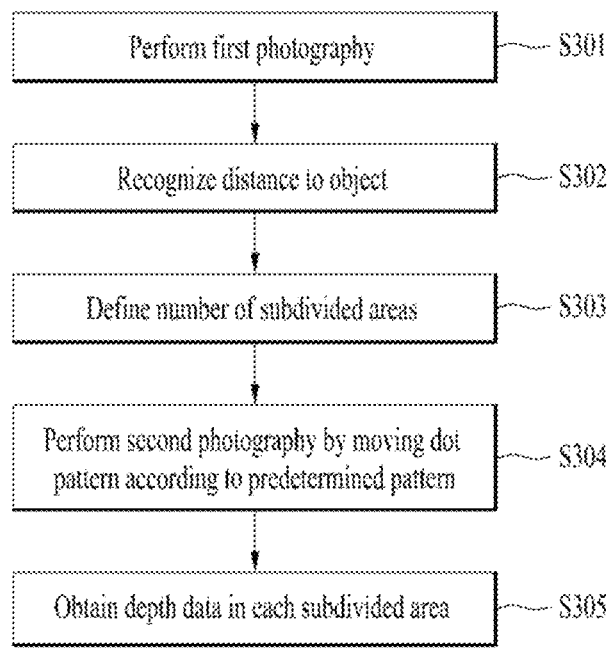

FIG. 11 is a flowchart illustrating a method of obtaining a depth image by emitting light in a dot pattern according to an embodiment of the present disclosure.

Hereinafter, a method for controlling an apparatus for generating a depth image according to the present disclosure will be described. The method for controlling the apparatus for generating a depth image may include: emitting light to an object in a dot pattern (S201); scanning the object by moving the dot pattern according to a predetermined pattern (S202); and generating depth data from light that is reflected by the object and received by an image sensor.

The generation of the depth data may include: obtaining information about the location of the dot pattern (S203); and acquiring the depth data based on the location information (S204). The information about the location of the dot pattern may include information about the location of a point to which one dot is emitted within a divided area corresponding to each receiving element of the image sensor. The acquisition of the depth data based on the information about the location of the dot pattern may include dividing the divided area into subdivided areas and acquiring depth data for each of the subdivided areas. The information about the location of the dot pattern may include information about the representative coordinates of a subdivided area to which one dot is emitted, rather than information about the exact coordinates of the dot. The information about the representative coordinates of the subdivided area may include information about the center coordinates of the subdivided area.

As the number of subdivided areas increases, that is, the number of subdivided areas obtained by dividing a divided area corresponding to one dot increases, the resolution of a depth image may increase. A depth image with a high resolution may be suitable for photographing a distant object, but such an image may not only increase the processing time but also causes a load to the apparatus for generating a depth image. Thus, the number of subdivided areas may need to be defined depending on the distance to the object.

To this end, according to the present disclosure, the distance to the object may be recognized (S302) by performing first photography (S301), and the number of subdivided areas may be defined (S303). Since the first photography is to obtain the distance to the object, it is not necessary to move the dot pattern. When the distance to the object increases, the number of subdivided areas may need to increase. However, the number of subdivided areas may be configured to increase depending on user selection instead of unconditionally increasing.

When the number of subdivided areas is determined, second photography may be performed by moving the dot pattern according to the predetermined pattern (S304). In this case, an actuator may need to be controlled such that each dot of the dot pattern moves over all subdivided areas within a corresponding divided area. Thereafter, depth data for each subdivided area may be obtained from light received by each receiving element of the image sensor.

It will be appreciated by those skilled in the art that the present disclosure can be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. An apparatus for generating a depth image, the apparatus comprising:
   a light source configured to generate light;
   a first optical system configured to direct the light generated by the light source toward an object in a dot pattern;
   an image sensor configured to receive light reflected from the object and convert the received light into an electrical signal, wherein the image sensor comprises one or more receiving elements each corresponding to a divided region of a projection area of the dot pattern;
   an image processor configured to obtain depth data from the electrical signal; and
   a controller operably connected to the light source, the first optical system, the image sensor, and the image processor,
   wherein the controller is configured to:
   control the first optical system to scan the object by moving the dot pattern according to a predetermined pattern,
   control the image processor to obtain the depth data based on location information about the dot pattern, wherein the location information comprises information about points to which one or more dots of the dot pattern are emitted; and
   control the image processor to divide each divided region into subregions and obtain depth data for each of the subregions.

2. The apparatus of claim 1, wherein the first optical system comprises:
   a collimator lens configured to collect the light emitted from the light source and direct the light in a parallel direction;
   a diffraction optical element configured to direct the light from the collimator lens toward the object in the dot pattern; and
   an actuator configured to control movement of the dot pattern.

3. The apparatus of claim 2, wherein the actuator comprises one of a voice coil motor, a liquid lens, or a microelectromechanical systems (MEMS) scanner.

4. The apparatus of claim 1, wherein a number of subregions for each divided region is based on a distance to the object, and wherein obtaining the depth data is based on the number of the subregions.

5. The apparatus of claim 1, wherein the controller is further configured to obtain the location information based on movement information of the actuator.

6. The apparatus of claim 1, wherein the image sensor comprises multiple arrays of receiving elements configured as a single photon avalanche diode (SPAD) array, and wherein the multiple arrays of receiving elements correspond to the dot pattern.

7. The apparatus of claim 6, comprising a second optical system configured to receive reflected light of the dot pattern by matching the light with the multiple arrays of receiving elements.

8. The apparatus of claim 7, wherein the light source is a vertical cavity surface emitting laser (VCSEL).

9. A method of controlling a device for generating a depth image, the method comprising:
   emitting light toward an object in a dot pattern;
   scanning the object by moving the dot pattern according to a predetermined pattern;
   receiving light reflected from the object and converting the received light into an electrical signal, wherein the light is received via an image sensor comprising one or more receiving elements each corresponding to a divided region of a projection area of the dot pattern; and
   generating depth data based on the electrical signal,
   wherein the depth data is obtained based on location information about the dot pattern,
   wherein the location information comprises information about points to which one or more dots of the dot pattern are emitted, and
   wherein each divided region is divided into subregions and depth data is obtained for each of the subregions.

10. The method of claim 9, further comprising:
    obtaining an image to determine a distance to the object; and
    configuring a number of the subregions based on the determined distance to the object.

* * * * *